Patented Aug. 6, 1940

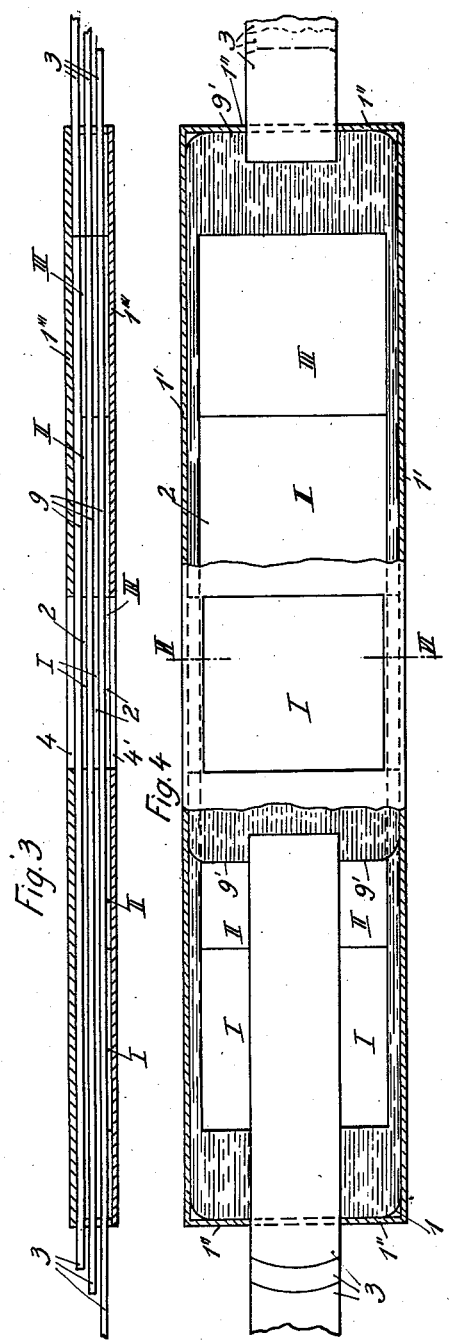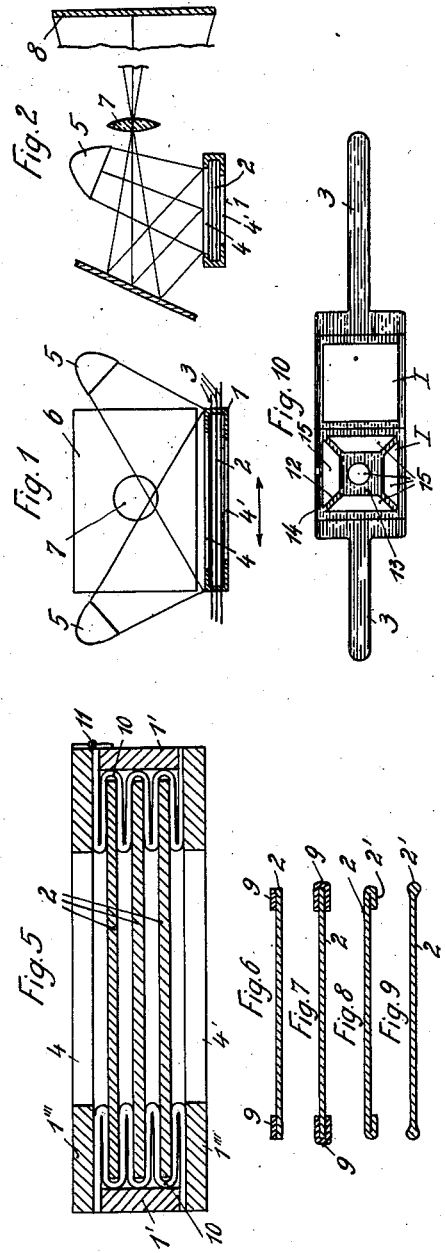

2,210,333

UNITED STATES PATENT OFFICE 2,210,333

DISPLAY DEVICE

Friedrich Kroner, Berlin-Charlottenburg, Germany, assignor to Transart Aktiebolag, Goteborg, Sweden Application October 13, 1937, Serial No. 168,789
In Germany October 13, 1936

4 Claims. (Cl. 88—24)

My invention relates to a display device and to a method and apparatus for projecting pictures by means of the "episcopic" method. As is well known, according to this method the picture or image to be projected is illuminated so as to reflect the light upon a mirror and from the mirror, through a suitable optical system, upon the projection screen.

It is an object of this invention to enable the subject matter of the projected image or of parts thereof to be changed, in order to show in superposed views the inner structure of physical objects, the sequence of actions or events, developments, methods, processes and the like.

Another object of the invention is to facilitate the projection of a plurality of images in an episcopic apparatus.

Still another object is to enable a plurality of image sheets which can be selectively superposed to be made visible or to be projected.

In the practice of my invention I may use various constructions of apparatus.

The invention will be better understood from the following detailed description with reference to the accompanying drawing, showing by way of example and schematically a practical embodiment of a device embodying the invention and in which:

Figure 1 is a schematical view of an episcope apparatus as viewed from the projection screen, including a device according to this invention.

Figure 2 is a side view of the scheme shown in Figure 1.

Figure 3 is a section on line I—I in Figure 4, of the displaying device, drawn on a larger scale.

Figure 4 is a plan view, partly in section, of Figure 3.

Figure 5 is a vertical cross section of another modification of the display device.

Figures 6 to 9 are various modifications of image strips or sheets for display devices according to the invention.

Figure 10 is a plan view of another form of an image strip.

Identical reference numerals are used to denote identical parts in the different figures.

As shown in Figures 1 and 2, the novel displaying device consists of a casing, box or guiding frame 1, in which a plurality of single image sheets or strips 2 can be independently moved in the direction indicated by the arrow, by a pull at their projections or tabs 3. The light radiated by the two lamps 5 of the episcope or epidiascope arrangeemnt upon the image window 4 of the box 1 is reflected by the opaque representations on the transparent sheets 2, that is to say, by the total representation formed by the superposed sheets upon a mirror 6. From the mirror, the light is reflected, through the optical system 7, upon the screen 8.

The structure of a preferred form of the device shown in Figures 1 and 2 is shown in Figures 3 and 4. As will be seen from these figures a plurality of image carrier sheets 2 which may consist of transparent cellulose products, such as cellulose derivatives, or sheet material known under the registered trade-mark "Cellophane," are superposed. The images or other representations may be applied to the image carriers 2 by any suitable means, for instance by printing. In order to prevent the superposed images from interfering or "mixing" with each other, the representations on the carrier sheets are made opaque.

The image carrier sheets 2 are slidable in a casing 1 and in this instance are about three times as long as the image window in the casing 1, the dimensions of which window correspond to the size of the single image that is to be projected.

In order to facilitate the slide movement of the sheets 2, these sheets 2 have at both ends projecting tabs 3 cemented or otherwise attached to the sheets. These tabs 3 may have different lengths or mutually displaced recessed portions at their ends so that each tab can be easily and independently handled.

The single sheets 2 are separated from each other and guided by intermediate layers 9. These intermediate layers may be connected either to the frame or casing 1 or to the strips 2, for instance by an adhesive. By the insertion of the layers 9 a spacing is formed between the single sheets 2 so that they can be moved easily and without substantial friction.

The provision of the intermediate layers 9 moreover offers the advantage that the single sheets 2 are separated from each other by these layers 9. Thus, the adjacent sheets 2 are prevented from sticking together and the representations on the sheets are protected against mechanical injuries. It is advantageous to make the tabs 3 and the intermediate layers 9 of a material which does not develop fibres or dust due to friction, such as for instance thicker transparent cellulose material, parchment or vellum-paper or the like.

As is well known, image carriers of transparent cellulose material when subjected to friction by sliding movement sometimes tend to produce and to accumulate static electricity whereby the friction and adhesion between the layers is deleteriously increased.

In order to prevent such electrostatic charges, electrically conductive portions may be provided at the device. To this end, the box 1 and/or the layers 9 may be made of metal sheets or may be metallised in a suitable manner and connected to ground.

In order to ensure accurate coincidence of the superposed pictures, it is necessary to provide for a very accurate guiding and adjustment of the single sheets. To this end, the lateral edges of the sheets 2 and/or of the layers 9 are provided to fit very accurately with a slide fit into the free space formed between the longitudinal walls 1' of the box 1. Moreover, the movement of the sheets 2 has to be limited very accurately for the same reason. According to Figures 3 and 4 the limitation of the slide movement of the sheets 2 is effected by the end edges 9' of the layers 9 engaging in the respective extreme position of the respective sheet 2 the walls 1" of the casing 1. The tabs 3 pass through slots in the walls 1" and may be attached to the layers 9, for instance by an adhesive, or may be made integral with these layers.

The single slidable units formed by a strip 2, appertaining intermediate layer or layers 9 and two tabs 3 may each be produced in various manners.

According to Figures 3 and 4, each layer 9 forms a frame around the three image portions I, II, III of the strip 2. The cross section of this form is shown in Figure 6, indicating a section on line VI—VI in Figure 4. Instead of providing edge portions 9 on one side of the strip 2, the layers 9 may be folded around the edge of the strip 2, as shown in Figure 7, thus protecting both sides of the strip 2. Again, according to Figure 8, the edge portions 2' of the strip 2 may be bent over or folded to form a protective and separating layer between the superposed strips. Another modification is shown in Figure 9, indicating thickened edge portions 2' which are produced by laterally compressing and upsetting the strip 2.

Another embodiment of the display device is shown in Figure 5 in a cross sectional view. In this case, strips of paper, cellulose material or the like 10 are folded zigzag-fashion and arranged along the walls 1' of the device. The end of the strips 10 are engaged between the top or bottom wall 1''' of the casing and the side walls 1' thereof. The strips 2 are slidable in the "pockets" or folds of the strips 10, which are suitably folded. This form of the device lends itself very easily for interchanging the strips 2 in order to provide new combinations of images, or to exchange defective strips. To this end, the top wall or cover 1" may be hingedly mounted at 11 so that it can be opened. Now, the folds or pockets of the strips 10 may be opened to remove the desired image strips 2 and to replace them by new ones. The requisite spacing between the strips 2 is maintained in this case by the strips 10 so that the image strips 2 do not require additional separating layers of the kind shown in any of Figures 6 to 9.

My novel device is especially adapted for producing by means of episcopic apparatus a plurality of different representations representing various possibilities of image combinations. For instance, the representations on the individual strips 2 are so arranged that the lowermost or bottom strip 2, showing a basic representation is projected first. To this end, for instance the image III of the lowermost sheet 2 is drawn, by means of its tab 3 into the position within the image window 4. Now, by actuating the tabs 3 of the other image carriers or strips 2 above the bottom strip 2, one or more images of these other strips 2 may also be brought into the position for projection, whereby the subject matter of the bottom image III may be more or less supplemented or changed by partly or entirely overlapping or covering it by the images on the upper strips 2. Thus, for instance, according to Figures 3 and 4, image III of the bottom strip 2 is superposed by the two images I of the upper strips 2. It will be understood that many other combinations can be obtained by suitably moving the single strips 2. Preferably, the middle image frames II are blank, at least as far as the upper strips 2 are concerned, to permit the projection of the bottom image alone.

Instead of providing three image frames I, II, III, two images I, II only may be provided, one of which is blank, and the casing 1 may be shortened accordingly by the length of one image frame. Moreover, a stationary image may be provided at the bottom, underneath the movable image strips, as at 4' in Figure 3. In this case, a single movable strip 2 may be provided on which a plurality of images are provided that may be selectively brought into coincidence with the stationary image 4'. Again, in another form, item 4' may be a window provided opposite the window 4, to permit of inspection or projection of the back side of the image strips 2, as indicated in Figures 1, 2, 3 and 5.

It will be understood that in this manner many different combinations are possible, since any of the individual images on the sheets 2 may be moved into the image window 4 or 4' alone or in any combination with other images.

I contemplate also within the scope of this invention to provide my novel device for direct inspection without an episcope or epidiascope, with or without a source of light or a lens system.

It will be understood that the actual form of the device, either regarded as a whole or in respect of its details, may be otherwise as desired than that shown in the drawing, provided the essential principles of my invention are embodied.

For the purpose of ensuring a flat and plan position of the strips 2, which is important for the satisfactory projection and in order to protect the strips 2 from the heat of the sources of light 5, a glass plate or the like may be placed on top of the device, or the cover 1"" may be made of such a material, leaving the windows 4 and 4' transparent, while the rest of the cover is made opaque, so as to prevent the strips 2 from being bleached by the light.

The tabs 3 may bear numbers or other indications or marks to render it possible for the attendant or teacher to produce and combine the images in a predetermined order in accordance with a lecture or the like. In the embodiment shown in Figures 1 and 2, marks must be provided to indicate the middle position of the strips 2 for projection of image or blank II. Moreover, margins may be provided between the single image frames I, II, III in order to make up for possible differences and inaccuracies in setting the strips 2 to their middle position according to corresponding marks.

According to another modification, intermediate layers 9 (Figure 3) of transparent sheet material may be used. In this case it is not necessary to stamp out the area of the layers 9 within the image frames of the strips 2 (such as shown in Figure 4). Moreover, the image carriers or strips 2 of transparent material, on which the images are printed by opaque colour, may be replaced by stamped image elements of paper or the like which may be attached to one or sandwiched between two transparent layers 9. According to Figure 10, these image elements 13 are movable between or together with intermediate layers. By thin ribs 12 the image elements 13 are connected to a frame 14 by which they are guided. It will be understood that the material of the strips is stamped out entirely at the portions 15 which have to be transparent.

In all embodiments of my novel device, where projection of the images is intended, it is important to make the strips 2 and the intermediate layers 9 or other means separating them so thin that the superposed layers are all practically positioned in one plane, with a tolerance of a few microns on fractions of a millimeter only, in order that the superposed images are all in focus at the same time and with the same setting of the optical lens system.

While I have herein shown and described certain preferred embodiments of my invention, I wish it to be understood that I do not confine myself to the details herein set forth by way of illustration, as modification and variation may be made without departing from the spirit of the invention or exceeding the scope of the appended claims.

I claim:

1. In combination with the casing of an episcopic projection apparatus, a plurality of thin transparent image-carrying strips disposed in superposed relationship and adapted to be displaced lengthwise, each including at least one transparent image frame having an opaque representation applied thereto, for the simultaneous episcopic projection of a composite of the said several representations, intermediate strips separating the said image-carrying strips from each other, means for guiding said image-carrying strips in said casing, and means for separately displacing said image-carrying strips relatively to each other, whereby the appearance of the episcopically projected composite may be varied.

2. In combination with the casing of an episcopic projection apparatus, a plurality of thin transparent image-carrying strips disposed in superposed relationship and adapted to be displaced lengthwise, each including at least one transparent image frame having an opaque representation applied thereto, for the simultaneous episcopic projection of a composite of the said several representations, intermediate strips separating the said image-carrying strips from each other, means for guiding said image-carrying strips in said casing, and means for separately displacing said image-carrying strips relatively to each other, whereby the appearance of the episcopically projected composite may be varied, said image-carrying strips having edges adapted to engage the end walls of said casing thereby limiting the lengthwise displacement of said image-carrying strips.

3. In combination with the casing of an episcopic projection apparatus, a plurality of thin transparent image-carrying strips disposed in superposed relationship in said casing each including at least one transparent image frame having an opaque representation applied thereto, for the simultaneous episcopic projection of a composite of the said several representations, intermediate strips separating the said image-carrying strips from each other, said intermediate strips having recessed portions corresponding to the area of the image frames of said image-carrying strips, and means for separately displacing said image-carrying strips relatively to each other whereby the appearance of the episcopically projected composite may be varied.

4. In combination with the casing of an episcopic projection apparatus, a plurality of thin transparent image-carrying strips disposed in superposed relationship in said casing each including at least one transparent image frame having an opaque representation applied thereto, for the simultaneously episcopic projection of a composite of the said several representations, intermediate layers positioned at the side walls of said casing and folded zigzag fashion so as to constitute pockets adapted to receive and separate said image-carrying strips from each other, and means for separately displacing said image-carrying strips relatively to each other whereby the appearance of the episcopically projected composite may be varied.

FRIEDRICH KRONER.